United States Patent [19]
Ogawa et al.

[11] 4,331,389
[45] May 25, 1982

[54] COMPACT ZOOM LENS SYSTEM

[75] Inventors: Ryota Ogawa, Kawagoe; Yasuo Takahashi, Tokyo, both of Japan

[73] Assignee: Asahi Kogaku Kogyo Kabushiki Kaisha, Tokyo, Japan

[21] Appl. No.: 167,960

[22] Filed: Jul. 14, 1980

[30] Foreign Application Priority Data

Jul. 13, 1979 [JP] Japan .................................. 54-89095

[51] Int. Cl.³ ............................................. G02B 15/14
[52] U.S. Cl. .................................................... 350/427
[58] Field of Search .............................. 350/423, 427

[56] References Cited

U.S. PATENT DOCUMENTS

| | | | |
|---|---|---|---|
| 3,615,125 | 10/1971 | Higuchi et al. | 350/427 |
| 4,025,167 | 5/1977 | Ikeda | 350/427 |
| 4,223,981 | 9/1980 | Mizutani et al. | 350/423 |

*Primary Examiner*—John K. Corbin
*Assistant Examiner*—Scott J. Sugarman
*Attorney, Agent, or Firm*—Sughrue, Mion, Zinn, Macpeak and Seas

[57] ABSTRACT

A compact zoom lens system capable of covering an intermediate telephoto range and having a zoom ratio of about two. The lens is compact, the number of lenses used is the minimum possible and aberration compensation is well accomplished. The lens system includes four lens groups having specified parameters.

1 Claim, 4 Drawing Figures f = 77 f = 100 f = 145

COMPACT ZOOM LENS SYSTEM

BACKGROUND OF THE INVENTION

The present invention relates to a compact zoom lens system capable of covering an intermediate telephoto range.

It is highly desirable that a zoom lens covering an intermediate telephoto range and having a zoom ratio of about two be compact for multiuse purposes. In order to miniaturize the overall zoom lens, the refractive power of each individual lens tends to have to be made quite strong or extreme. In prior art lens constructions, in order to avoid this tendency, the number of lenses was undesirably increased as disclosed in, for example, Japanese Patent Publication No. 51/2383.

SUMMARY OF THE INVENTION

It is thus an object of the present invention to provide a zoom lens covering an intermediate telephoto range and which is small in size in which the number of lenses is minimized.

In accordance with this and other objects of the invention, there is provided a lens system including a fixed first lens group, a movable second lens group providing a variator effect, a third lens group having a focusing compensation effect and a fourth lens group. The first lens group is formed, in order from the object side, of a positive meniscus lens $L_1$ having a positive refractive power on the object side, a negative meniscus lens $L_2$ having a negative refractive power on the image side and a positive lens $L_3$ having a positive refractive power on the object side. The two lenses $L_2$ and $L_3$ are cemented together. The second lens group is formed, in order from the object side, of a negative lens $L_4$ having a strong negative refractive power on the image side, a biconcave lens $L_5$ and a positive lens $L_6$ with the lenses $L_5$ and $L_6$ being cemented together. The third lens group includes, in order from the object side, a biconvex lens $L_7$ and a negative meniscus lens $L_8$, the two lenses being cemented together. The fourth lens group is composed, in order from the object side, of a positive lens $L_9$ having a strong positive refractive power on the object side, a positive meniscus lens $L_{10}$ having a strong positive refractive power on the object side, a negative lens $L_{11}$ having a strong refractive power on the image side and a positive lens $L_{12}$ having a strong positive refractive power on the object side.

DESCRIPTION OF THE PREFERRED EMBODIMENTS

Figure 1:
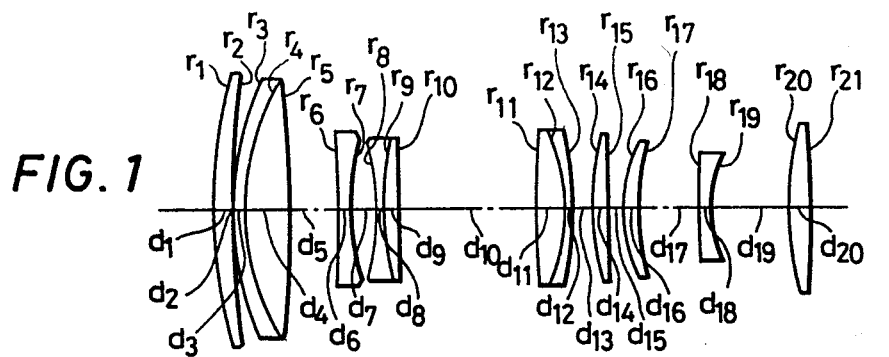
FIG. 1 is a cross-sectional view of the lens construction of a preferred embodiment of a zoom lens of the invention at the wide angle end.
Figure 2A:
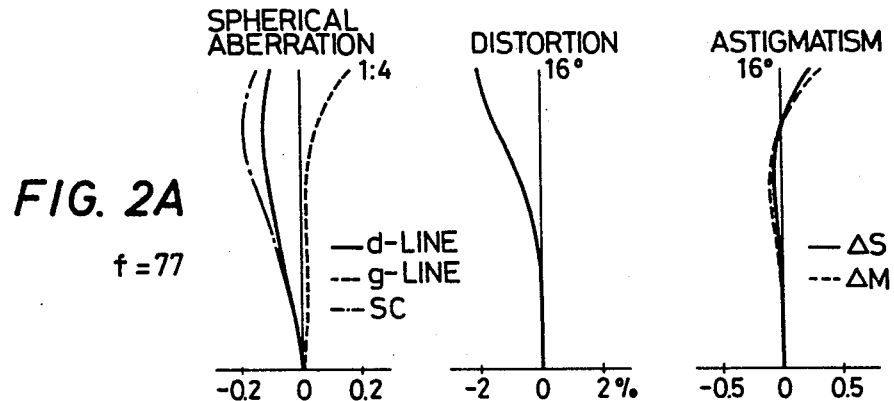
FIGS. 2A, 2B and 2C are aberration graphs at the wide angle end, the intermediate position and the telephoto end, respectively, of the lens system of an Example of a zoom lens of the present invention.
Figure 2B:
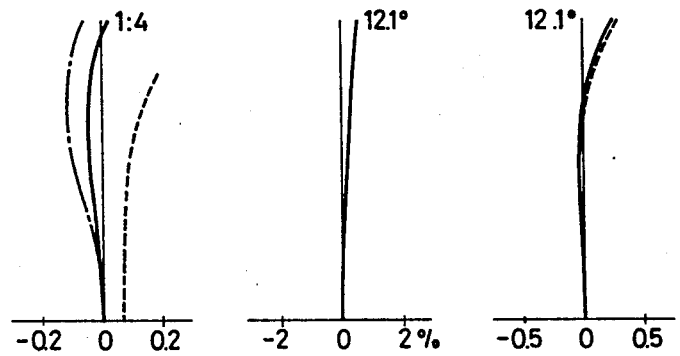
Figure 2C:
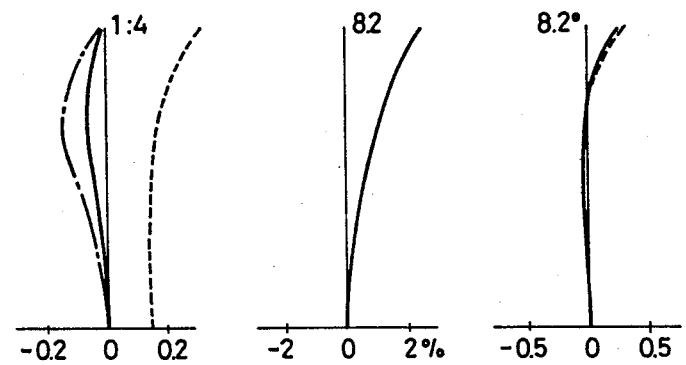

According to the present invention, although the lens system in compact, aberration compensation is well accomplished and the number of lenses used is decreased to the minimum possible.

According to the present invention, a lens system is composed, in order from the object side, of a fixed first lens group (it should be noted that the fixed first lens group can cooperate with a moving mechanism as a focusing lens group), a movable second lens group having a variator effect, a third lens group having a focusing compensation effect and a fixed fourth lens group, with lens system satisfying the following conditions:

(1) $f_W < f_1 < 1.4 f_W$,
(2) $0.18 f_W < e_1' < 0.3 f_W$,
(3) $0.35 f_W < |f_2| < 0.5 f_W$, $f_2 < 0$, and
(4) $0.15 f_T < e_2' < 0.3 f_T$ where $e_1'$ and $e_2'$ are the principal intervals of or spacings between lens groups between the first and second lens groups and between the second and third lens groups, respectively, at the wide angle end, $f_1$ and $f_2$ are the focal lengths of the first and second lens groups, and $f_W$ is the overall focal length at the wide angle end and $f_T$ is the overall focal length at the telephoto end. The first lens group is formed, in order from the object side, of a positive meniscus lens $L_1$ having a positive refractive power on the object side, a negative meniscus lens $L_2$ having a negative refractive power on the image side and a positive lens $L_3$ having a positive refractive power on the object side. The two lenses $L_2$ and $L_3$ are cemented together. The second lens group is formed, in order from the object side, of a negative lens $L_4$ having a strong negative refractive power on the image side, a biconcave lens $L_5$ and a positive lens $L_6$ with the lenses $L_5$ and $L_6$ being cemented together. The third lens group includes, in order from the object side, a biconvex lens $L_7$ and a negative meniscus lens $L_8$, the two lenses being cemented together. The fourth lens group is composed, in order from the object side, of a positive lens $L_9$ having a positive refractive power on the object side, a positive meniscus lens $L_{10}$ having a strong positive refractive power on the object side, a negative lens $L_{11}$ having a strong refractive power on the image side and a positive lens $L_{12}$ having a strong positive refractive power on the object side. The lens system further satisfies the following conditions:

$$\frac{\nu_1 + \nu_3}{2} > 65, \quad (5)$$

$$\nu_2 < 30, \quad (6)$$

$$\frac{n_1 + n_3}{2} < 1.6, \quad (7)$$

$$n_2 > 1.7, \quad (8)$$

$$\frac{\nu_4 + \nu_5}{2} > 60, \quad (9)$$

$$\nu_6 < 30, \quad (10)$$

$$n_6 - n_5 > 0.1, \quad (11)$$

$$\frac{n_9 + n_{10}}{2} < 1.6, \quad (12)$$

$$n_{11} > 1.7, \quad (13)$$

$$0.2 f_W < r_{19} < 0.35 f_W, \text{ and} \quad (14)$$

$$0.1 f_W < d_{19} < 0.25 f_W \quad (15)$$

where $n_1, n_2, \ldots, n_{12}$ and $\nu_1, \nu_2, \ldots, \nu_{12}$ are the refractive indices and the Abbe numbers of the respective lenses, $r_{19}$ is the radius of curvature of the nineteenth lens surface from the object side and $d_{19}$ is the spacing on the image side of the lens surface denoted by $r_{19}$.

The conditions (1), (2), (3) and (4) will now be described. These four conditions are required for a basic construction to realize the compactness, and in particular, by the provision of condition (2), the desired zoom ratio is maintained under a wide variation of conditions of refractive powers of the first and second lens groups. This means that aberration compensation is advantageously achieved.

Regarding condition (1), when the lower limit is exceeded, the generation of chromatic aberration, spherical aberration and comatic aberration is increased while, when the upper limit is exceeded, the refractive power is loaded on the second lens group for maintenance of a suitable zoom ratio which is not preferable for a balance of aberration compensation.

Regarding condition (2), by the provision of the lower limit value, an image point of the first lens group is suitably set close to a first principal point of the second lens group. This relation has substantially the same effect as strengthening the refractive power of the first lens group in the variator effect of the second lens group. However, it is advantageous for aberration compensation because the first lens group does not in fact then need to be strengthened in refractive power. Above the upper limit, the overall length of the lens is increased which is not effective for miniaturization of the lens system.

Regarding condition (3), the upper limit is required to maintain compactness and the lower limit allows the balance of aberration compensation to be suitably maintained and in particular is required to decrease variation of the astigmatism at various zoom positions.

The lower limit of condition (4) is determined in order to maintain a suitable moving space for the second lens groups under the above described conditions (1), (2) and (3) and the upper limit thereof is determined in order not to overly increase the diameters of the third and fourth lens groups.

The specific constructions of each lens group and conditions (5) to (13) will now be described in greater detail.

By providing the first lens group with two meniscus lenses $L_1$ and $L_2$, it is possible to lessen the variation of astigmatism by zooming and by cementing the lenses $L_2$ and $L_3$ together and the aberration variation is stabilized. In particular, this effect is remarkable on the telephoto side. By conditions (5) and (6), the residual amount of the chromatic aberration is decreased particularly on the telephoto side. Conditions (7) and (8) are required to prevent the Petzval's sum from becoming negative.

Since the first lens group is positive, it is desired to position initially a negative lens of opposite sign next to the preceding lens group in order to adjust the conditions of comatic aberration and magnification chromatic aberration of the second lens group. For this reason, the negative lenses $L_4$ and $L_5$ are arranged on the object side in the second lens group. By cementing the lenses $L_5$ and $L_6$, aberration variation due to zooming is stabilized. Conditions (9) and (10) are required to reduce the generation of chromatic aberration in the second lens group to the minimum possible. A function of condition (11) is to reduce the variation of spherical aberration, comatic aberration and astigmatism for zooming.

In the third lens group, an achromatic effect is caused by the cemented tablet type.

In the fourth lens group, by the continuation of the positive lenses $L_9$ and $L_{10}$, a lens type where the Petzval's sum is positive is realized. More specifically, conditions (12) and (13) contribute to this effect. Conditions (14) and (15) are required to suitably maintain the image curvature of the overall lens system. Above the upper limits of both conditions, the image curvature tends to be positive and below the lower limits thereof it tends to be negative.

An Example of a lens system satisfying the above-described conditions is given in which, particularly, astigmatism is maintained at a possible minimum and the overall length including provision for backfocus is about 3.6 times the length of a diagonal line of the image field, 43.2 mm in the Example. That is, the lens system is extremely compact and the lens system is composed of a small number of lenses, namely, three lenses in the first lens group, three lenses in the second lens group, two lenses in third lens group and four lenses in the fourth lens group.

The Example will now be described with reference to the table below. In the table, f is the focal length, $\omega$ is half the viewing angle, $r_1, \ldots, r_{21}$ are the radii of curvature of the respective lens surface, $d_1, \ldots, d_{20}$ are the lens thicknesses or lens intervals, $n_1, \ldots, n_{12}$ are the refractive indices of the respective lenses at the d-line, $\nu_1, \ldots, \nu_{12}$ are the Abbe numbers of the lenses, $f_W$ is the overall focal length at the wide angle end, $f_T$ is the overall focal length at the telephoto end, $f_1$ is the focal length of the first lens group, $f_2$ is the focal length of the second lens group, and $e_1$ is the distance between the principal points of the first and second lens groups.

EXAMPLE

| | $f = 77.064 \sim 144.997/1:41$ | | | $2\omega = 32° \sim 16.5°$ | |
|---|---|---|---|---|---|
| $r_1$ | 86.431 | $d_1$ 3.00 | $n_1$ 1.52542 | $\nu_1$ | 64.5 |
| $r_2$ | 180.812 | $d_2$ 0.20 | | | |
| $r_3$ | 51.821 | $d_3$ 1.37 | $n_2$ 1.80518 | $\nu_2$ | 25.4 |
| $r_4$ | 37.630 | $d_4$ 7.15 | $n_3$ 1.48749 | $\nu_3$ | 70.1 |
| $r_5$ | −750.150 | $d_5$ 8.109 ~ 27.579 | | | |
| $r_6$ | −640.000 | $d_6$ 2.00 | $n_4$ 1.61800 | $\nu_4$ | 63.4 |
| $r_7$ | 34.040 | $d_7$ 4.26 | | | |
| $r_8$ | −40.350 | $d_8$ 1.50 | $n_5$ 1.61800 | $\nu_5$ | 63.4 |
| $r_9$ | 51.200 | $d_9$ 2.75 | $n_6$ 1.80518 | $\nu_6$ | 25.4 |
| $r_{10}$ | −2335.559 | $d_{10}$ 22.851 ~ 1.401 | | | |
| $r_{11}$ | 107.650 | $d_{11}$ 4.50 | $n_7$ 1.64250 | $\nu_7$ | 58.4 |
| $r_{12}$ | −33.299 | $d_{12}$ 1.50 | $n_8$ 1.80518 | $\nu_8$ | 25.4 |
| $r_{13}$ | −63.102 | $d_{13}$ 3.585 ~ 5.564 | | | |
| $r_{14}$ | 44.962 | $d_{14}$ 2.79 | $n_9$ 1.50048 | $\nu_9$ | 65.9 |
| $r_{15}$ | −1774.426 | $d_{15}$ 2.54 | | | |
| $r_{16}$ | 23.000 | $d_{16}$ 2.65 | $n_{10}$ 1.48749 | $\nu_{10}$ | 70.1 |
| $r_{17}$ | 37.630 | $d_{17}$ 9.70 | | | |
| $r_{18}$ | 180.000 | $d_{18}$ 2.31 | $n_{11}$ 1.80610 | $\nu_{11}$ | 40.9 |
| $r_{19}$ | 21.730 | $d_{19}$ 12.55 | | | |
| $r_{20}$ | 52.000 | $d_{20}$ 3.50 | $n_{12}$ 1.64850 | $\nu_{12}$ | 53.0 |
| $r_{21}$ | −299.940 | | | | |
| $f_W = 77.064$ | | | $e_1' = 17.685$ | | |
| $f_T = 144.997$ | | | $e_2' = 30.461$ | | |
| $f_1 = 91.467$ | | | | | |
| $f_2 = -32.005$ | | | | | |

What is claimed is:

1. A compact zoom lens system comprising, in order from the object side, a fixed first lens group, a movable second lens group having a variator effect, a third lens group having a focusing compensation effect and a fixed fourth lens group, said first lens group comprising, in order from the object side, a positive meniscus lens having a positive refractive power on the object side and a cemented lens comprising a negative meniscus lens having a negative refractive power on the image side and a positive lens having a positive refractive power on the object side; said second lens group comprising, in order from the object side, a negative lens having a strong negative refractive power on the image side and a cemented lens comprising a biconcave lens and a positive lens; said third lens group comprising, in order from the object side, a cemented lens comprising a biconcave lens and a negative meniscus lens; and said fourth lens group comprising, in order from the object side, a positive lens having a strong positive refractive power on the object side, a positive meniscus lens having a strong positive refractive power on the object side, a negative lens having a strong refractive power on the image side and a positive lens having a strong positive refractive power on the object side, said lens system satisfying the following conditions:

| f = 77.064 ~ 144.997/1:41 | | | | $2\omega = 32° \sim 16.5°$ |
|---|---|---|---|---|
| $r_1$ | 86.431 | $d_1$ | 3.00 $n_1$ | 1.52542 $\nu_1$ 64.5 |
| $r_2$ | 180.812 | $d_2$ | 0.20 | |
| $r_3$ | 51.821 | $d_3$ | 1.37 $n_2$ | 1.80518 $\nu_2$ 25.4 |
| $r_4$ | 37.630 | $d_4$ | 7.15 $n_3$ | 1.48749 $\nu_3$ 70.1 |
| $r_5$ | −750.150 | $d_5$ | 8.109 ~ 27.579 | |
| $r_6$ | −640.000 | $d_6$ | 2.00 $n_4$ | 1.61800 $\nu_4$ 63.4 |
| $r_7$ | 34.040 | $d_7$ | 4.26 | |
| $r_8$ | −40.350 | $d_8$ | 1.50 $n_5$ | 1.61800 $\nu_5$ 63.4 |
| $r_9$ | 51.200 | $d_9$ | 2.75 $n_6$ | 1.80518 $\nu_6$ 25.4 |
| $r_{10}$ | −2335.559 | $d_{10}$ | 22.851 ~ 1.401 | |
| $r_{11}$ | 107.650 | $d_{11}$ | 4.50 $n_7$ | 1.64250 $\nu_7$ 58.4 |
| $r_{12}$ | −33.299 | $d_{12}$ | 1.50 $n_8$ | 1.80518 $\nu_8$ 25.4 |
| $r_{13}$ | −63.102 | $d_{13}$ | 3.585 ~ 5.564 | |
| $r_{14}$ | 44.962 | $d_{14}$ | 2.79 $n_9$ | 1.50048 $\nu_9$ 65.9 |
| $r_{15}$ | −1774.426 | $d_{15}$ | 2.54 | |
| $r_{16}$ | 23.000 | $d_{16}$ | 2.65 $n_{10}$ | 1.48749 $\nu_{10}$ 70.1 |
| $r_{17}$ | 37.630 | $d_{17}$ | 9.70 | |
| $r_{18}$ | 180.000 | $d_{18}$ | 2.31 $n_{11}$ | 1.80610 $\nu_{11}$ 40.9 |
| $r_{19}$ | 21.730 | $d_{19}$ | 12.55 | |
| $r_{20}$ | 52.000 | $d_{20}$ | 3.50 $n_{12}$ | 1.64850 $\nu_{12}$ 53.0 |
| $r_{21}$ | −299.940 | | | |
| $f_W = 77.064$ | | | $e_1' = 17.685$ | |
| $f_T = 144.997$ | | | $e_2' = 30.461$ | |
| $f_1 = 91.467$ | | | | |
| $f_2 = -32.005$ | | | | | wherein f is the focal length, $\omega$ is half the viewing angle, $r_1, \ldots, r_{21}$ are the radii of curvature of the respective lens surface, $d_1, \ldots, d_{20}$ are the lens thicknesses or lens intervals, $n_1, \ldots, n_{12}$ are the refractive indices of the respective lenses at the d-line, $\nu_1, \ldots, \nu_{12}$ are the Abbe numbers of the lenses, $f_W$ is the overall focal length at the wide angle end, $f_T$ is the overall focal length at the telephoto end, $f_1$ is the focal length of the first lens group, $f_2$ is the focal length of the second lens groups, and $e_1$ is the distance between the principal points of the first and second lens groups.

* * * * *